(12) United States Patent
Wang et al.

(10) Patent No.: US 11,567,386 B2
(45) Date of Patent: Jan. 31, 2023

(54) ELECTROCHROMIC DEVICES AND METHODS ASSOCIATED THEREWITH

(71) Applicant: SAGE ELECTROCHROMICS, INC., Faribault, MN (US)

(72) Inventors: Yigang Wang, Maple Grove, MN (US); Bryan D. Greer, Northfield, MI (US); Peter Bocek, Northfield, MN (US); Jean-Christophe Giron, Edina, MN (US); Thomas Doublein, Saint Paul, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 310 days.

(21) Appl. No.: 16/593,234

(22) Filed: Oct. 4, 2019

(65) Prior Publication Data

US 2020/0117067 A1 Apr. 16, 2020

Related U.S. Application Data

(60) Provisional application No. 62/744,017, filed on Oct. 10, 2018.

(51) Int. Cl.
*G02F 1/163* (2006.01)
*E06B 9/24* (2006.01)

(52) U.S. Cl.
CPC ............... *G02F 1/163* (2013.01); *E06B 9/24* (2013.01); *E06B 2009/2464* (2013.01)

(58) Field of Classification Search
CPC ..... G02F 1/163; E06B 9/24; E06B 2009/2464
See application file for complete search history.

(56) References Cited

U.S. PATENT DOCUMENTS 7,133,181 B2   11/2006   Greer
2007/0097484 A1*  5/2007   Libretto ............... G02F 1/163
                                                             359/275

(Continued)

FOREIGN PATENT DOCUMENTS

CN   105388677 A   3/2016
CN   106558294 A   4/2017

(Continued)

OTHER PUBLICATIONS

International Search Report and Written Opinion for PCT/US2019/054692, dated Jan. 20, 2020, 9 pages.

*Primary Examiner* — William R Alexander
*Assistant Examiner* — Sharrief I Broome
(74) *Attorney, Agent, or Firm* — Abel Schillinger, LLP; Robert N Young

(57) ABSTRACT

A method of operating an electrochromic device comprising: coupling a logic device to the electrochromic device; applying a voltage to the electrochromic device; receiving a current from the electrochromic device in response to the provided voltage; and with the logic device, determining an exact operating condition of the electrochromic device from the received current. A method of operating a plurality of electrochromic devices comprising: adjusting a frequency of voltage applied to the plurality of electrochromic devices, wherein each of the plurality of electrochromic devices is adjusted by a different frequency; measuring a duration of time required to change tint states of each of the electrochromic devices; and identifying a location of each of the plurality of electrochromic devices in response to the measured duration of time required to change the tint states of each of the electrochromic device.

7 Claims, 4 Drawing Sheets

(56) References Cited

U.S. PATENT DOCUMENTS

| | | |
|---|---|---|
| 2011/0046810 A1 | 2/2011 | Bechtel et al. |
| 2012/0268803 A1 | 10/2012 | Greer et al. |
| 2013/0271812 A1* | 10/2013 | Brown .................... G02F 1/163 |
| | | 359/275 |
| 2014/0160550 A1 | 6/2014 | Brown et al. |
| 2015/0070745 A1* | 3/2015 | Pradhan .................... E06B 9/24 |
| | | 359/275 |
| 2015/0092259 A1 | 4/2015 | Greer et al. |
| 2015/0116811 A1 | 4/2015 | Shrivastava et al. |
| 2017/0082903 A1 | 3/2017 | Vigano et al. |
| 2017/0097553 A1* | 4/2017 | Jack .......................... E06B 9/24 |
| 2017/0146884 A1* | 5/2017 | Vigano .................. G02F 1/163 |
| 2017/0184938 A1 | 6/2017 | Bergh et al. |
| 2018/0088432 A1 | 3/2018 | Shrivastava et al. |
| 2018/0188627 A1* | 7/2018 | Vigano .................... G09G 3/19 |

FOREIGN PATENT DOCUMENTS

| | | |
|---|---|---|
| CN | 106940508 A | 7/2017 |
| CN | 107850815 A | 3/2018 |
| JP | H05100628 A | 4/1993 |
| JP | 2004507775 A | 3/2004 |
| JP | 2006-053551 A | 2/2006 |
| JP | 2012047955 A | 3/2012 |
| KR | 20070067393 A | 6/2007 |
| WO | 2017155833 A1 | 9/2017 |
| WO | 2018098089 A1 | 5/2018 |

* cited by examiner

ELECTROCHROMIC DEVICES AND METHODS ASSOCIATED THEREWITH

CROSS-REFERENCE TO RELATED APPLICATIONS

This application claims priority under 35 U.S.C. § 119(e) to U.S. Provisional Application No. 62/744,017, entitled "ELECTROCHROMIC DEVICES AND METHODS ASSOCIATED THEREWITH," by Yigang Wang et al., filed Oct. 10, 2018, which is assigned to the current assignee hereof and is incorporated herein by reference in its entirety.

FIELD OF THE DISCLOSURE

The present disclosure relates to electrochromic devices and methods associated therewith.

RELATED ART

Electrochromic devices are frequently used to provide selective variable shading for various uses, including commercial and residential buildings. Installation of electrochromic device is typically performed by installing and commissioning each electrochromic device individually. In such a manner, technicians pair each unit with a channel to properly identify the unit for control. Recently, electrochromic devices have come with an integral identification tag to permit automatic commissioning of the device. The identification tag relays unique information about the electrochromic device to the controller to permit automatic commissioning of the device.

The inclusion of identification tags is expensive and time consuming. Industries utilizing electrochromic devices continue to demand improved systems and methods of commissioning and operation.

BRIEF DESCRIPTION OF THE DRAWINGS

Embodiments are illustrated by way of example and are not intended to be limited in the accompanying figures.

DETAILED DESCRIPTION

Figure 1:
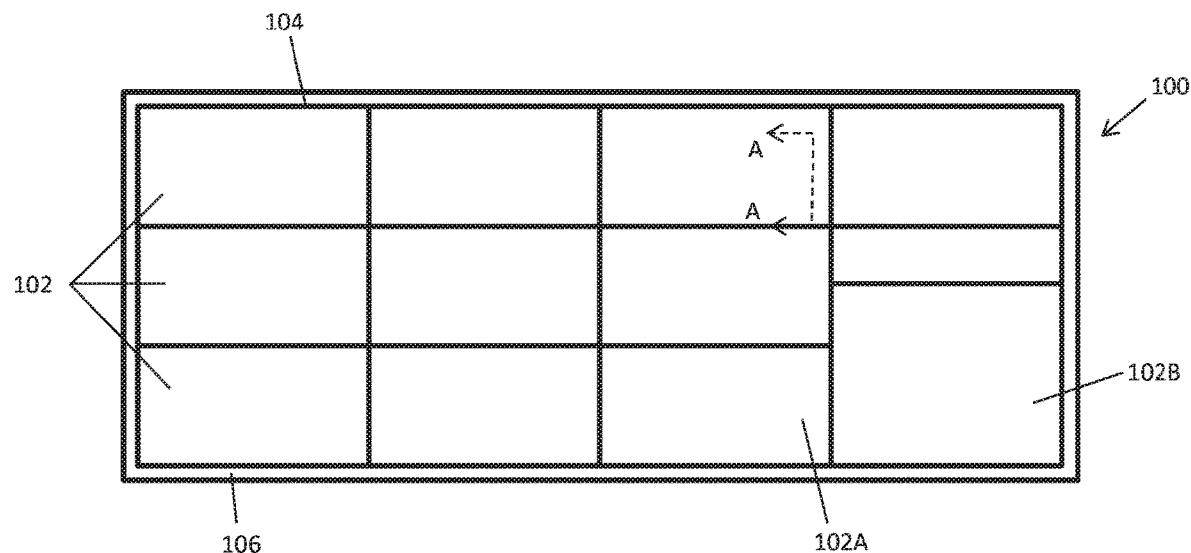
FIG. 1 includes an elevation view of an array including a plurality of electrochromic devices in accordance with an embodiment.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The terms "generally," "substantially," "approximately," and the like are intended to cover a range of deviations from the given value. In a particular embodiment, the terms "generally," "substantially," "approximately," and the like refer to deviations in either direction of the value within 10% of the value, within 9% of the value, within 8% of the value, within 7% of the value, within 6% of the value, within 5% of the value, within 4% of the value, within 3% of the value, within 2% of the value, or within 1% of the value.

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the electrochromic device and electrochromic arts.

In accordance with an aspect, a method of operating an electrochromic device can include installing the electrochromic device, coupling a logic device to the electrochromic device, applying a voltage to the electrochromic device, receiving a current from the electrochromic device in response to the provided voltage, and, with a logic device, determining an exact operating condition of the electrochromic device from the received current. In an embodiment, the method can further include operating the electrochromic device based at least in part on the exact operating condition of the electrochromic device. In a particular embodiment, the exact operating condition of the electrochromic device can include an ionic resistance of the electrochromic device, a leakage resistance of the electrochromic device, a separate resistance of the electrochromic device or element connected therewith, or any combination thereof. In another embodiment, the exact operating condition of the electrochromic device can include unit efficiency, unit leakage, unit capacitance, unit areal size, or any combination thereof. In a particular embodiment, the separate resistance can include an ITO resistance, a wire resistance of wires coupled with the electrochromic device, or both.

In accordance with another aspect, a method of operating a plurality of electrochromic devices can include adjusting a frequency of voltage applied to the plurality of electrochromic devices, measuring a duration of time required to change tint state of each of the electrochromic devices, and identifying a location of each of the plurality of electrochromic devices in response to the measured duration of time required to change the tint state of each of the electrochromic devices. In a particular embodiment, adjusting the frequency of voltage is performed by adjusting each of the electrochromic devices by a different frequency. In a particular embodiment, adjusting the frequency of voltage is performed simultaneously for all of the plurality of electrochromic devices.

FIG. 1 illustrates an array 100 of electrochromic devices including a plurality of electrochromic devices 102 disposed within an opening 104 of a window frame 106. In an embodiment, the array 100 can be part of a building, such as part of a façade, a wall, or any structure disposed in or around the building. While illustrated as a single, contiguous grouping, the array 100 can include a plurality of spaced apart electrochromic devices. For instance, at least one of the electrochromic devices 102 can be part of a different portion or area of the building spaced apart from the other electrochromic devices 102. By way of example, at least one electrochromic device 102 can be spaced apart from all other electrochromic devices.

In an embodiment, the array 100 can include at least 2 electrochromic devices 102, at least 3 electrochromic devices 102, at least 4 electrochromic devices 102, at least 5 electrochromic devices 102, at least 10 electrochromic devices 102, or at least 20 electrochromic devices 102. In another embodiment, the array 100 can include no greater than 1,000 electrochromic devices 102, no greater than 100 electrochromic devices 102, or no greater than 50 electrochromic devices 102.

In an embodiment, all of the electrochromic devices 102 in the array 100 can have a same size, shape, or combination thereof as compared to one another. In another embodiment, at least two of the electrochromic devices 102 can have different sizes, shapes, or combinations thereof as compared to one another. For example, in a particular instance, the array 100 can include a first electrochromic device 102A with a first size and a second electrochromic device 102B with a second size different from the first size. In a particular embodiment, the first and second sizes can differ in areal size, width, height, or any combination thereof.

In an embodiment, wiring corresponding to each of the electrochromic devices 102 can be coupled with a common port, such as a multi-channel electronic device adapted to be coupled with the plurality of electrochromic devices.

In an embodiment, the plurality of electrochromic devices 102 can be installed during a same installation operation, such as during an array installation and commissioning process. Commissioning can include, for example, determining exact operating conditions of at least one of the electrochromic devices 102, mapping at least one of the plurality of electrochromic devices 102, or both.

Figure 2:
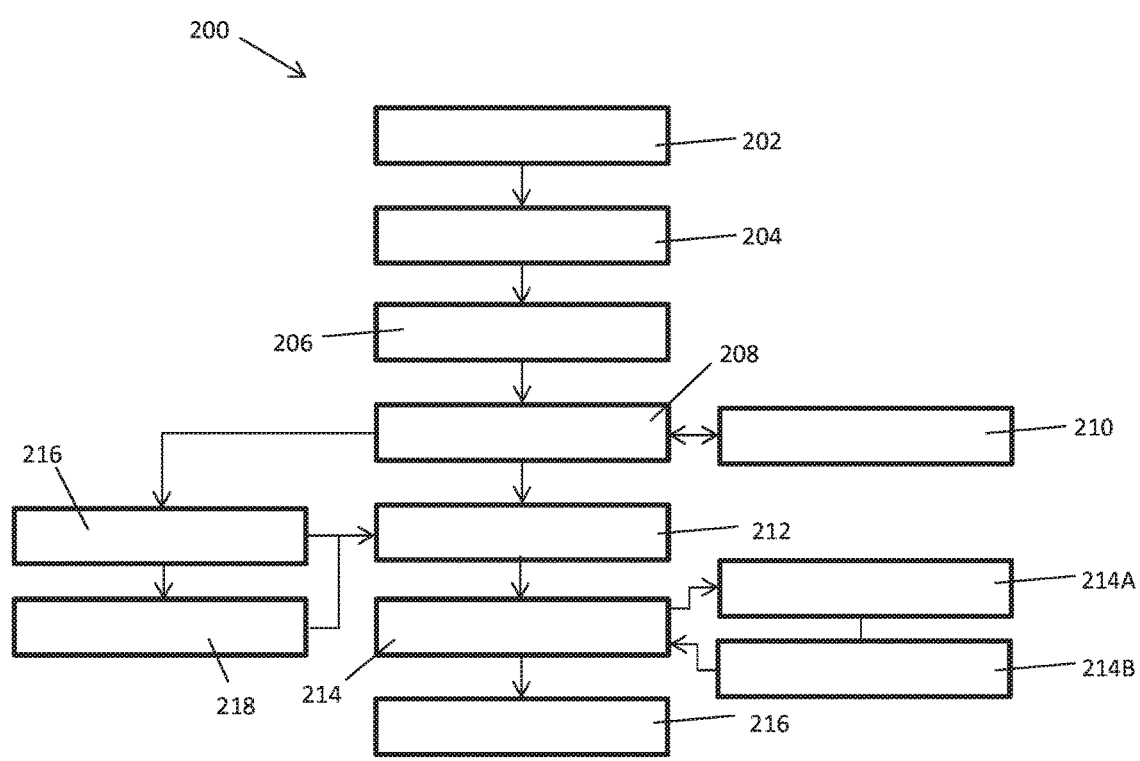
FIG. 2 includes a flow chart of a method of mapping a location of an electrochromic device within an array in accordance with an embodiment.

FIG. 2 provides an exemplary method 200 of mapping a location of an electrochromic device 102 within the array 100. In a particular aspect, mapping the location of at least one of the electrochromic devices 102 can allow for individual adjustment of at least a portion of the array 100. In such a manner, an operator can selectively adjust portions of the array 100 as necessary. For instance, the operator can specifically tint one or more of the electrochromic devices 102 to a first desired tint while tinting another, or other, of the electrochromic devices 102 to a second desired tint different than the first desired tint. This may be particularly suitable, for example, in arrays 100 operating in environments where operators seek variable transmission rates within the array 100.

In an embodiment, the method 200 can include installing 202 the electrochromic device 102 in a building, connecting 204 the electrochromic device 102 with a power supply (not illustrated), and supplying power 206 to the electrochromic device 102 from the power supply. After supplying power 206 to the electrochromic device 102, the electrochromic device 102 can be observed 208 by an image capture device.

In an embodiment, the image capture device can be adapted to capture images of the array 100. In a more particular embodiment, the image capture device can include a smart device, a camera, or a video camera. In a particular embodiment, the image capture device can have a refresh rate (sometimes referred to as a frame rate) of at least 0.1 frames per second, at least 0.5 frames per second, at least 1 frame per second, at least 2 frames per second, at least 5 frames per second, at least 10 frames per second, at least 30 frames per second, at least 45 frames per second, or at least 60 frames per second. In another embodiment, the refresh rate can be no greater than 15,000 frames per second, or no greater than 5,000 frames per second. The image capture device can be adapted to capture successive images of the electrochromic device 102, such as for example, from a same relative position with respect to the electrochromic device 102.

In an embodiment, the image capture device can be disposed at a position spaced apart from the electrochromic device 102. In an embodiment, the image capture device can be adapted to capture images of at least a portion of the electrochromic device 102. In a more particular embodiment, the image capture device can be adapted to capture images of the entire electrochromic device 102. In more particular embodiment, the image capture device can be adapted to capture images of a plurality of electrochromic devices 102. In yet a more particular embodiment, the image capture device can be adapted to capture images of at least a portion of all of the electrochromic devices 102 in the array 100. In an even more particular embodiment, the image capture device can be adapted to capture images of all portions of all electrochromic devices 102 in the array 100.

In a particular instance, observing 208 the electrochromic device 102 can include observing a plurality of electrochromic devices 102. For instance, observing 208 the electrochromic device 102 can include observing at least 2 electrochromic devices 102, at least 3 electrochromic devices 102, at least 4 electrochromic devices 102, at least 5 electrochromic devices 102, or at least 10 electrochromic devices 102.

In an embodiment, observing 208 the electrochromic device 102 can be performed by the image capture device at a distance of at least 1 inch from the electrochromic device 102, at least 6 inches from the electrochromic device 102, at least 1 foot from the electrochromic device 102, at least 2 feet from the electrochromic device 102, at least 5 feet from the electrochromic device 102, at least 10 feet from the electrochromic device 102, or at least 20 feet from the electrochromic device 102. In another embodiment, observing 208 can be performed by the image capture device from a distance no greater than 1000 feet from the electrochromic device 102, no greater than 500 feet from the electrochromic device 102, or no greater than 100 feet from the electrochromic device 102. In an embodiment, the image capture device can be handheld. In another embodiment, the image capture device can be mounted, such as for example, on a stand. In a particular instance the stand can include a tripod adapted to remain at a fixed position.

In certain instances, observing 208 the electrochromic device 102 can be performed from a stationary (e.g., fixed) position. In other instances, observation 208 can be performed by a mobile or moveable position whereby the image capture device 102 moves relative to the electrochromic devices 102 during observation 208.

In an embodiment, the method 200 can further include adjusting 210 an attribute of power provided by the power supply to the electrochromic device 102. In a more particular embodiment, adjustment 210 of the power supply can occur during a period of observation 208 by the image capture device. That is, for example, the power provided to the electrochromic device 102 can be adjusted between or during successive images captured by the image capture device.

In an embodiment, the electrochromic device 102 can be at a first operating state prior to adjustment 210. In a more particular embodiment, the electrochromic device 102 can be at a first tint prior to adjustment 210. The resulting adjustment 210 can modify the electrochromic device 102 to a second operating state, or a second tint state, different than the first operating state or tint state.

In a particular instance, the first operating state of the electrochromic device 102 can be random prior to adjustment 210. That is, for example, adjustment 210 can be performed on the electrochromic device 102 from any initial tint state the electrochromic device 102 was at prior to adjustment 210. In a particular embodiment, adjustment 210 can be performed from an unknown tint state. In embodiments where a plurality of electrochromic devices 102 are to be mapped, all of the plurality of electrochromic devices 102 can be at random, or even unknown, tint states prior to the adjustment 210. By performing the adjustment 210 from a random, or even unknown, tint state it may be possible to reduce commissioning time by eliminating the need to pre-adjust the electrochromic device 102 prior to adjusting 210.

In other instances, the first operating state of the electrochromic device 102 can be preselected prior to adjustment 210. That is, for example, the electrochromic device 102 can be brought to a base line condition from which adjustment 210 can be made. For instance, the electrochromic device 102 can be pre-adjusted to a particular tint state (e.g., 5% tint, or 10% tint, or 15% tint, or 20% tint, etc.) before adjusting 210 the electrochromic device 102 therefrom.

In an embodiment, adjustment 210 of the power supply can result in a change to the electrochromic device 102. For instance, adjustment 210 of the power supply can alter a tint state of the electrochromic device 102. In an embodiment, adjustment 210 of the power supply includes adjusting a frequency of voltage supplied to the electrochromic device 102. In another embodiment, adjustment 210 of the power supply can include adjusting a peak voltage, a current, or any combination thereof. One or more of these adjustments can result in a state change, causing the electrochromic device 102 to incur a different observable characteristic, such as a tint change.

In an embodiment, adjustment 210 of the frequency of voltage supplied to the electrochromic device 102 can include a frequency adjustment of at least 0.1 Hertz (Hz), at least 0.5 Hz, at least 1 Hz, at least 2 Hz, at least 3 Hz, at least 4 Hz, at least 5 Hz, at least 6 Hz, at least 7 Hz, at least 8 Hz, at least 9 Hz, or at least 10 Hz. In another embodiment, adjustment 210 of the frequency can include a frequency adjustment of no greater than 10,000 Hz, no greater than 2,000 Hz, or no greater than 100 Hz.

While adjustment 210 can occur over a wide range of frequencies (e.g., between 0.1 Hz and 10,000 Hz), in certain instances the adjustment in frequency can be small (e.g., less than 10 Hz), such that a time required for detectable change in the electrochromic device 102 in response to the adjusted frequency is short. That is, the greater the frequency adjustment made to the electrochromic device 102, the greater the duration of time required to complete the adjustment. By adjusting 210 the frequency by small increments it is possible to quickly detect the affect of the frequency adjustment on the electrochromic device 102.

In an embodiment, adjustment 210 of the frequency is performed such that the detectable response of the electrochromic device 102 occurs in a time period less than 1 minute, less than 30 seconds, less than 10 seconds, or less than 1 second. In a more particular embodiment, adjustment 210 of the frequency is performed such that the detectable response of the electrochromic device 102 occurs in a time period less than 0.75 seconds, less than 0.5 seconds, less than 0.25 seconds, less than 0.1 seconds, or less than 0.01 seconds.

In an embodiment, adjustment 210 of the frequency of voltage can be performed such that frequency of voltage of at least a few of the plurality of electrochromic devices 102 in the array 100 are adjusted. In a particular embodiment, adjustment 210 of the frequency of voltage is performed such that the frequency of voltage of all of the plurality of electrochromic devices 102 in the array 100 are adjusted. In an embodiment, adjustment 210 of the frequency of voltage can occur simultaneously, or generally simultaneously, for at least two of the plurality of electrochromic devices 102. In a more particular embodiment, adjustment 210 of the frequency of voltage can occur simultaneously, or generally simultaneously, for all of the plurality of electrochromic devices 102.

In an embodiment, adjustment 210 of the frequency of voltage can be performed such that at least two of the electrochromic devices 102 are adjusted by different frequency amounts. For instance, the first electrochromic device 102A can be adjusted by a first frequency and the second electrochromic device 102B can be adjusted by a second frequency different from the first frequency. By way of non-limiting example, the first frequency adjustment for the first electrochromic devices 102A can be 1 Hz and the second frequency adjustment for the second electrochromic device 102B can be 2 Hz. In an embodiment, adjustment 210 of the frequency can be performed such that all of the electrochromic devices 102 are adjusted by different frequency amounts. That is, for example, each of the electrochromic devices 102 can be adjusted by a unique frequency amount.

In an embodiment, adjustment 210 of the frequencies of the plurality of electrochromic devices 102 is performed randomly. For instance, the power supply, a logic device coupled with the power supply, or a combination thereof can generate a random adjustment for at least two of the plurality of electrochromic devices 102. The adjusted frequency can be recorded, such as at the power supply, such that the input adjustment amount for each of the plurality of adjusted electrochromic devices 102 is known.

In another embodiment, adjustment 210 can be performed using a frequency adjustment guide including a preselected or known adjustment protocol for each of the electrochromic devices 102. The adjustment protocol can be programmed into a logic device, such as contained within a memory device coupled with the logic device, and used to adjust each of the plurality of electrochromic devices 102 by the preselected or known amounts.

Using the image capture device, the electrochromic device 102 can be observed 208 following the adjustment 210 to detect a change in attribute of the electrochromic device 102. If the adjustment 210 is detectable, (i.e., the image capture device can detect a characteristic adjustment of the electrochromic device 102 in response to the adjustment 210) the method 200 can further include measuring 212 a duration of time required to complete the adjustment 210. That is, for instance, the image capture device can detect duration of time between the input of the adjustment 210 to the electrochromic device 102 and the completed transition of the electrochromic device 102 in response to the adjustment 210. More particularly, the image capture device can capture images of the electrochromic device 102 before the adjustment, during the adjustment, after the adjustment, or a combination thereof such that a time between adjustment is calculable.

If the adjustment 210 is not detectable, the method 200 can include further adjusting 210 the electrochromic device 102 a successive time and observing 208 the electrochromic device 102 for the changed attribute. In an embodiment, the successive adjustment 210 can include a same frequency adjustment as previously performed (e.g., the initial adjustment 210 is an adjustment of 1 Hz and the successive adjustment is an adjustment of 1 Hz). In another embodiment, the successive adjustment 210 can include a different adjustment (e.g., the initial adjustment 210 is an adjustment of 1 Hz and the successive adjustment is an adjustment of 1.5 Hz). In a particular instance, the successive adjustment 210 can be randomly performed in a manner as previously described. In another instance, the successive adjustment 210 can be selected from, or occur in response to, the frequency adjustment guide described above. In an embodiment, successive adjustments 210 can be performed until the change is observable 208 by the image capture device. In certain instances, successive adjustments 210 can be performed at a plurality of spaced apart intervals. In a particular instance, successive adjustments 210 can be performed at a plurality of equally spaced apart intervals. The intervals can be either preselected or random.

In an embodiment, the detected duration of time required to complete the adjustment 210 can be measured 212 by a logic device coupled with the image capture device. For example, the logic device can include a microprocessor employing a commissioning program adapted to calculate the duration of time required to change the tint state of the electrochromic device 102 based on a plurality of images provided by the image capture device. In certain instances, the logic device can be integral with the image capture device. For instance, the logic device and image capture device can include a same smart device having a camera and a microprocessor employing an application adapted to measure the duration of time. The application can include, for example, an application running on a smartphone.

In an embodiment, adjusting 210 the voltage is performed prior to measuring 212 the duration of time required to change tint states.

In embodiments where adjustment 210 is performed simultaneously for at least two of the plurality electrochromic devices 102, measuring 212 the duration of time can be performed at a generally same time, or an exact same time, for the at least two of the plurality of electrochromic devices 102. In another embodiment, measuring 212 the duration of time can be performed at different times, such as successive or spaced apart time periods.

The method 200 can further include identifying 214 the electrochromic device 102 within the array 100 in response to the adjustment time. In an embodiment, the duration of time required for each of the electrochromic devices 102 to transition in response to the changed input performed by adjusting 210 the voltage frequency can be different for all of the adjusted electrochromic devices 102. More specifically, because each of the plurality of electrochromic devices 102 is adjusted 210 by a different voltage frequency, the duration of time required to transition in response to the adjusted frequency can be different of each of the plurality of electrochromic devices 102.

In an embodiment, identifying 214 the electrochromic device 102 within the array 100 can be performed by a logic device, such as the previously described logic device.

In an embodiment, identification 214 of the electrochromic device 102 within the array 100 can include framing 214A the image(s) captured by the image capture device to frame areas corresponding with each electrochromic device 102 and correlating 214B at least some of the framed electrochromic devices 102 to the measured 212 duration of times to respond to the adjusted 208 frequency. In certain instances, framing 214A the image(s) can include automatically framing the images, for example, using a logic device or application adapted to detect borders, edges, or other indicia of an electrochromic device and map edges thereof. In other instances, framing 214A the image(s) can include at least partially manually framing the image. The edges detecting during framing 214A can be used to map the position of electrochromic devices 102 within the array 100 without defining the electrochromic devices 102 with respect to the controller or power supply.

In certain instances, the logic device measuring 212 the duration of time can also identify 214 the electrochromic device 102. In another embodiment, identifying 214 the electrochromic device 102 can be performed by a separate logic device, such as by a remote logic device in communication with the image capture device, the previously described logic device, the power supply, or any combination thereof. In certain instances, the remote logic device can be wirelessly coupled with the image capture device, the previously described logic device (which can be on-site), the power supply, or any combination thereof.

In an embodiment, the steps of installing 202 the electrochromic device 102 in the building, connecting 204 the electrochromic device 102 with the power supply, supplying power 206 to the electrochromic device 102 from the power supply, and observing 208 the electrochromic device 102 can be performed on-site. As used herein, performance of an action "on-site" refers to the occurrence of the action at the location of the electrochromic device 102. For instance, "on-site" can refer to the occurrence of the action at the exact location of the electrochromic device 102 (e.g., within the room containing the electrochromic device 102), or a general area surrounding the electrochromic device 102 (e.g., within the building containing the electrochromic device 102 or in a nearby area associated with commissioning or building operations). In another embodiment, adjusting 210 the attribute of power provided by the power supply to the electrochromic device 102 can be performed on-site. In a further embodiment, measuring 212 the duration of time required to complete the adjustment 210 can be performed on-site. In yet another embodiment, identifying 214 the electrochromic device 102 within the array 100 in response to the adjustment time can be performed on-site. In such a manner, the entire method 200 of mapping the location of an electrochromic device 102 within the array 100 can be performed on-site.

In another embodiment, at least one of adjusting 210 the attribute of power provided by the power supply to the electrochromic device 102, measuring 212 the duration of time required to complete the adjustment 210, and identifying 214 the electrochromic device 102 within the array 100 can occur at a remote location. As used herein, performance of an action at a "remote location" refers to occurrence of the action at a location spaced apart from the general area surrounding the electrochromic device 102. For instance, performance of at least one of adjusting 210, measuring 212, and identifying 214 can occur in a different city, state, or country as compared to the step of installing 202 the electrochromic device 102.

In an embodiment, off-site steps can be performed in real time. In another embodiment, off-site steps can be performed at a later time. By way of a non-limiting example, the observed 208 change of the electrochromic device 102 can occur at a first time and the measured 212 duration of time required to complete the adjustment can occur at a second time different from the first time. For instance, observation 208 can occur at a first time (e.g., 12 pm) and measurement 212 can occur at a second time during the same day (e.g., 4 pm). In another instance, observation 208 can occur on a first day and measurement 212 can occur on a second day different from the first day.

In certain embodiments, the observed 208 change of the electrochromic device 102 can be recorded 216 and transmitted 218 for analysis (e.g., for measurement 212). By way of non-limiting example, recording 216 can occur by storing one or more images associated with the observed 208 change in a memory device, such as a hard drive, removable thumb drive, CD-ROM, remote or local server, cloud storage, another similar storage medium, or any combination thereof. The stored images can be accessed for purpose of measurement 212. In an embodiment, measurement 212 can occur upon initiation by a human user. In another embodiment, measurement 212 can occur autonomously, such as for example, by a program adapted to automatically measure 212 the duration of time in response to a triggering condition. The triggering condition can include, for instance, recording the one or more images associated with the observed 208 change, uploading or transmitting the one or more images to a specific location, uploading or transmitting a specific file type, selecting an autonomous operating parameter to automatically trigger the performance of measuring 212 the duration of time, another similar triggering condition, or any combination thereof.

In certain instances, recording 216 the observed 208 change can occur simultaneously, or generally simultaneously, with the measurement 212 of the duration of time. Thus, for example, the recording can be utilized as a back-up in case of data loss or for later validation.

In an embodiment, the method 200 can further include operating 216 at least one particular electrochromic device of the plurality of electrochromic devices 102 after identifying 214 the location of the at least one particular electrochromic device 102. In a more particular embodiment, operating 216 can be performed by operating 216 the entire array 100. In an embodiment, operating 216 the array 100, or at least one of the electrochromic devices 102 of the array 100, can include adjusting a tint state of at least one of the electrochromic devices 102 within the array 100.

Figure 3:
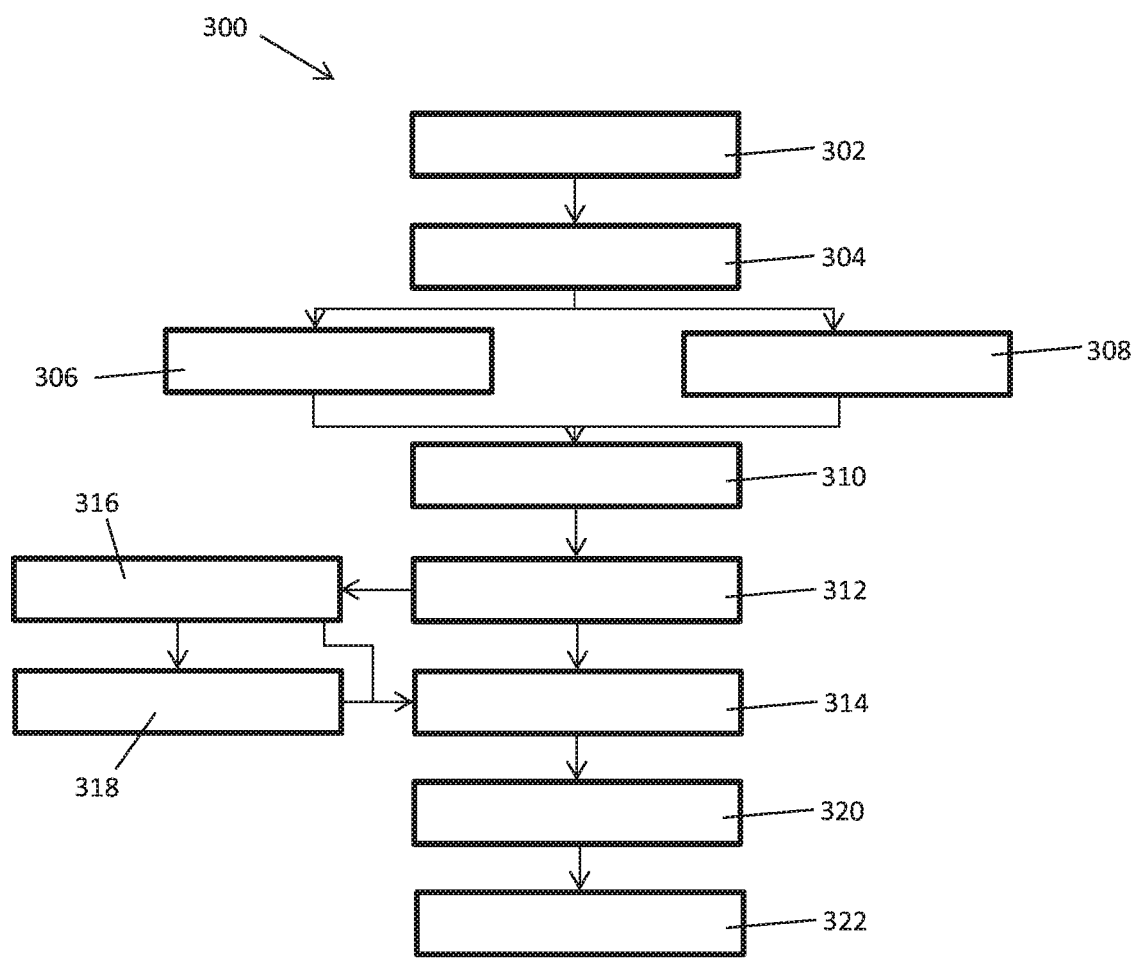
FIG. 3 includes a flow chart of a method of determining exact operating conditions of an electrochromic device within the array in accordance with an embodiment.

FIG. 3 provides an exemplary method 300 of determining exact operating conditions of electrochromic devices 102, such as one or more electrochromic devices 102 within the array 100. As used herein, "exact operating conditions" refer to unique operating characteristics of electrochromic devices such as, for example, unit efficiency, unit leakage, unit capacitance, unit areal size, or any combination thereof. The "exact operating conditions" can correspond to the unique traits of each individual electrochromic device 102. To the contrary, traditional identification tags used to provide identifying information about electrochromic devices typically contain generic information relating to operating characteristics of the tagged electrochromic device. For instance, electrochromic devices with identification tags typically include generic operating information estimated based on the known attributes of the device, such as size and dimensions. Thus, for example, identification tags coupled with electrochromic devices of particular sizes receive a same identification tag containing generic operating conditions for that sized device. Such generic operating conditions fail to account for unique operating characteristics of the specific electrochromic device having the identification tag, such as unique unit efficiency, unique unit leakage, unique unit capacitance, and unique unit areal size. Thus, for instance, the tagged electrochromic device may be operating at a state different from intended as the tagged electrochromic device may have a slightly or notable characteristic difference from the generic identification tag. This difference can become pronounced in certain arrays 100 where similar sized electrochromic devices are not exactly the same size but include same identification tag operating parameters. For instance, when an operator selectively tints the array 100, one or more of the electrochromic devices 102 can be off-tint from the remaining electrochromic devices 102. Moreover, identification tags add cost to manufacturing and typically require interconnects extending through the electrochromic device frame.

In an embodiment, the method 300 can include installing 302 the electrochromic device 102 in a building, connecting 304 the electrochromic device 102 with a power supply (not illustrated), and supplying power 306 to the electrochromic device 102 from the power supply. The method 300 can further include coupling 308 a logic device to the electrochromic device 102. In an embodiment, the logic device can be the same as the logic device described with respect to the method 200 of mapping the location of the electrochromic device 102 within the array 100. In another embodiment, the logic device can include a unique logic device not previously described herein. In certain instances, the logic device can be coupled 308 with the electrochromic device 102 directly. In other instances, the logic device can be coupled 308 with the electrochromic device 102 indirectly. For example, the logic device can be coupled 308 with the electrochromic device 102 through the power supply. In a more particular embodiment, the step of coupling 308 the logic device to the electrochromic device 102 can be performed by coupling the logic device to the power supply.

In an embodiment, supplying power 306 to the electrochromic device 102 can be performed prior to coupling 308 the logic device to the electrochromic device 102. In another embodiment, supplying power 306 to the electrochromic device 102 can be performed after coupling 308 the logic device to the electrochromic device 102. In a further embodiment, connecting 304 the electrochromic device 102 with the power supply can be performed prior to coupling 308 the logic device to the electrochromic device 102. In yet another embodiment, connecting 304 the electrochromic device 102 with the power supply can be performed after coupling 308 the logic device to the electrochromic device 102.

In an embodiment, the method 300 can further include applying 310 a voltage to the electrochromic device 102. In a particular embodiment, applying 310 the voltage can occur simultaneously, or generally simultaneously, with supplying power 306 to the electrochromic device 102. That is, for instance, the applied voltage 310 can correspond with an initial voltage associated with powering on the electrochromic device 102. In another embodiment, applying 310 the voltage can occur after supplying (initial) power 306 to the electrochromic device 102. For instance, the applied 310 voltage can differ from the voltage provided when initially supplying power 306 to the electrochromic device 102. By way of non-limiting example, supplying power 306 to the electrochromic device 102 can correspond with supplying a first particular voltage and applying 310 the voltage can correspond with supplying a second particular voltage different than the first particular voltage.

In an embodiment, the applied 310 voltage can be the same as the supplied voltage 206, such as part of a same excitation voltage. In another embodiment, the applied 310 voltage can be the same as the adjusted 210 voltage. In certain instances, the method 200 of mapping the electrochromic device 102 and the method 300 of determining the exact operating conditions of electrochromic device 102 can be part of a same method. In a more particular instance, mapping and determining the exact operating conditions of at least one of the electrochromic devices 102 can occur at a same time. In another particular instance, mapping and determining the exact operating conditions of all of electrochromic devices 102 in the array can occur at a same time.

In an embodiment, the excitation voltage for mapping 200 and determining 300 the exact operating conditions can include different signals. The different signals can be generated by the power supply, multi-channel electronic device, or a combination thereof. In another embodiment, the excitation voltage for mapping 200 and determining 300 the exact operating conditions can be part of one signal, such as one modulated signal. The modulated signal can include information used for mapping 200 and determining 300 the exact operating condition. In certain instances, signal processing techniques such as demodulation or filtering can be used to extract information from observed 208 images or received 312 currents (described below in greater detail) relating to mapping 200 and determining 300 the exact operating condition. In an embodiment, signal processing techniques can be implemented by a logic element (such as one of the logic elements described elsewhere herein or a separate logic element).

In certain instances, application 310 of the voltage to the electrochromic device 102 can occur continuously. That is, for example, application 310 of voltage can occur for an uninterrupted duration of time. In an embodiment, application 310 of the voltage can occur for a duration of at least 5 seconds, at least 30 seconds, at least 1 minute, at least 5 minutes, at least 20 minutes, or at least 60 minutes. In another embodiment, application 310 of voltage can occur for at least 120 minutes, at least 180 minutes, at least 200 minutes, at least 240 minutes, at least 300 minutes, at least 360 minutes, at least 420 minutes, or at least 480 minutes. In certain instances, application 310 of voltage can occur continuously over a period of at least one day, or even at least two days. In certain instances, continuous application 310 of voltage can permit observation of the electrochromic device 102 over an array of light conditions, temperature conditions, building ambient conditions, or a combination thereof.

Figure 4:
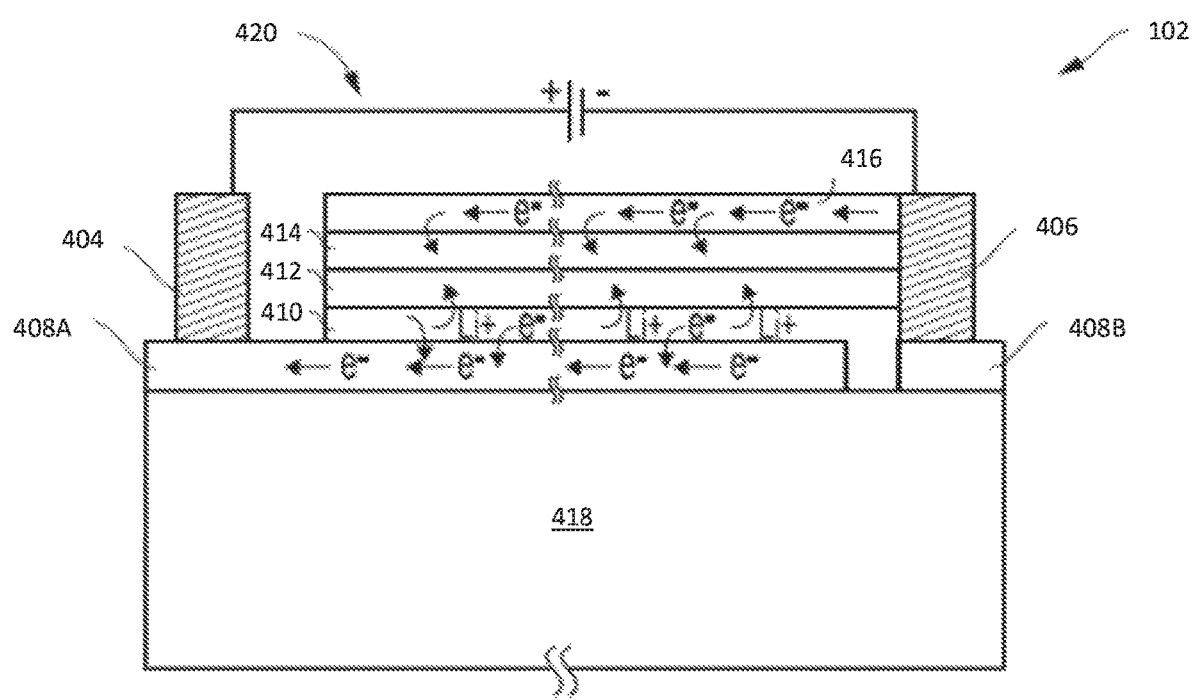
FIG. 4 includes a cross-sectional view of an electrochromic device in accordance with an embodiment as seen along line A-A in FIG. 1.

Power provided from the power supply can be provided to the electrochromic device 102 through one or more intermediary wires or through a wireless protocol. Referring to FIG. 4, an electrochromic device 102 disposed on a substrate 418 in accordance with an embodiment can receive power bus bars 404 and 406. The electrochromic device 102 may include isolated transparent conductive layer regions 408A and 408B, a counter electrode layer 410, a solid ion conductive layer 412, an electrochromic layer 414 and a transparent conductive layer 416. The layers, including regions 408A and 408B, 410, 412, 414, and 416 can be vapor deposited. In another embodiment, the relative positions of the electrochromic layer 414 and the counter electrode layer 410 may be interchanged. The bus bar 404 can be in contact with only the conductive layer region 408A, and the bus bar 406 can be in contact with the conductive layer 416. The bus bars 404 and 406 can be formed by printing a conductive ink or using another technique. The power supply 420 and wires connected to the bus bars 404 and 406 may or may not be part of the electrochromic device 102.

When the power supply 420 is operated to apply an electrical potential across the bus bars 404 and 406, electrons, and thus a current, flows from the bus bar 404, across the transparent conductive layer 416 and into the electrochromic layer 414. Further, ions flow from the counter electrode layer 410, through the ion conductive layer 412, and to the electrochromic layer 414, and a charge balance is maintained by electrons being extracted from the counter electrode layer 410, and then being inserted into the electrochromic layer 414 via the external circuit. The above-described electrochromic device 102 may be a solid state device. In the tinted state, ambient light may be at least partially prevented from passing through the electrochromic device 102. In the bleached state, ambient light may generally pass through the electrochromic device 102, for example, to illuminate an interior space of a building.

The deposition and manufacture of the previously described layers, including for example, the counter electrode layer 410, the ion conductive layer 412, the electrochromic layer 414, and the transparent conductive layer 416, may include defects such as impurities in variable concentration, anomalies resulting from improperly calibrated tooling, or both. These defects and anomalies can result in unique, different-than-ideal performance of electrochromic devices 102. Additionally environmental factors including temperature and humidity, and job specific conditions such as installation locations may affect performance of the electrochromic devices 102.

Referring again to FIG. 3, the method 300 can further include receiving 312 a current from the electrochromic device 102 in response to the applied 310 voltage. In an embodiment, the received 312 current can be received at the power supply. In another embodiment, the received 312 current can be received at the logic device. In yet another embodiment, the received 312 current can be received at an intermediary element in communication with at least one of the power supply and logic device. In a further embodiment, the received 312 current can be received at the power supply and logic device.

In an embodiment, one or more defects or anomalies in the electrochromic device 102 can result in a unique, different-than-ideal performance thereof. Accordingly, in a particular instance, the same applied 310 voltage provided to the same manufacturing spec sized electrochromic devices 102 can result in different received 312 currents.

In an embodiment, the received 312 current can be used to determine 314 an exact operating condition of the electrochromic device 102. As previously described, in an embodiment, the exact operating condition can include unique operating characteristics of the electrochromic device 102 such as, for example, unit efficiency, unit leakage, unit capacitance, unit areal size, or any combination thereof. Determining 314 the exact operating condition can include, for instance, determining at least one of an ionic resistance of the electrochromic device 102, a leakage resistance of the electrochromic device 102, a separate resistance of the electrochromic device 102 or element connected therewith, or any combination thereof. Ionic resistance can generally define the resistance to flow of current within the electrochromic device. Ionic resistance can occur due to various factors including ion conductivity, ion mobility, layer thickness, defect inclusion rate, contact surface area, and combinations thereof. Leakage resistance can generally define the loss of energy, or unused energy supplied to the electrochromic device 102 but not affecting the performance thereof. Leakage resistance can occur when ions tunnel through insulating layers, subthreshold conduction conditions, transistor impurities and anomalies, and combinations thereof. Separate resistance can refer to other sources of resistance apart from ionic and leakage resistances. Separate resistance can include, for instance, wire resistance between the power supply and electrochromic device 102. Wire resistance is dependent on numerous factors including wire composition, quality, gauge, length, and contact quality with the electrochromic device 102. Separate resistance can further include indium tin oxide (ITO) resistance occurring within the electrochromic device 102.

In an embodiment, determining 314 the exact operating condition of the electrochromic device 102 can be performed by a logic device, including any one or more of the previously described devices, another logic device, or any combination thereof.

In certain instances, determining 314 the exact operating condition of the electrochromic device 102 can be performed continuously. That is, for example, determining 314 the exact operating condition of the electrochromic device 102 can occur for an uninterrupted duration of time. In an embodiment, determining 314 the exact operating condition can occur for a duration of at least 5 seconds, at least 30 seconds, at least 1 minute, at least 5 minutes, at least 20 minutes, or at least 60 minutes. In another embodiment, determining 314 the exact operating condition can occur for at least 120 minutes, at least 180 minutes, at least 200 minutes, at least 240 minutes, at least 300 minutes, at least 360 minutes, at least 420 minutes, or at least 480 minutes. In certain instances, determining 314 the exact operating condition can occur continuously over a period of at least one day, or even at least two days.

In an embodiment, application 310 of the voltage to the electrochromic device 102 and receiving 312 current from the electrochromic device 102 in response to the applied 310 voltage can occur at a same, or generally same, time. In a more particular embodiment, application 310 of the voltage to the electrochromic device 102 and receiving 312 current from the electrochromic device 102 in response to the applied 310 voltage, and determining 314 the exact operating condition of the electrochromic device 102 can occur at a same, or generally same time. In another particular embodiment, application 310 of the voltage to the electrochromic device 102 and receiving 312 current from the electrochromic device 102 in response to the applied 310 voltage can occur at a same, or generally same, time and determining 314 the exact operating condition of the electrochromic device 102 can occur at a later time.

In certain instances, the received 312 current can be recorded 316 and transmitted 318 for analysis (e.g., to determine 314 the exact operating condition). By way of non-limiting example, recording 316 can occur by storing the received 312 current (or values/indicia associated therewith) in a memory device, such as a hard drive, removable thumb drive, CD-ROM, remote or local server, cloud storage, another similar storage medium, or any combination thereof. The stored data can be accessed for purpose of determining 314 the exact operating condition of the electrochromic device 102. In an embodiment, determination 314 of the exact operating condition can occur upon initiation by a human user. In another embodiment, determining 314 the exact operating condition can occur autonomously, such as for example, by a program adapted to automatically determine 314 the exact operating condition in response to a triggering condition. The triggering condition can include, for instance, recording the data associated with the received 312 current, uploading or transmitting the data to a specific location, uploading or transmitting a specific file type, selecting an autonomous operating parameter to automatically trigger the performance of determining 314 the exact operating condition, another similar triggering condition, or any combination thereof.

Figure 5:
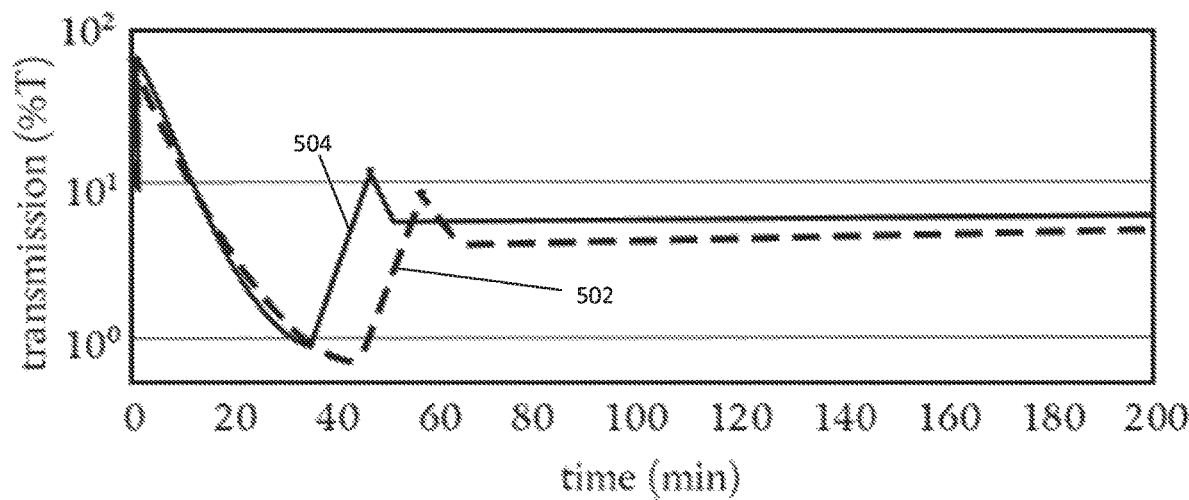
FIGS. 5 and 6 include graphs reflecting operation of an electrochromic device based on operating conditions provided by an identification tag and exact operating conditions determined in accordance with an embodiment described herein.

In an embodiment, the method 300 can further include operating 320 the electrochromic device 102 at least in part based on the exact operating condition determined in step 314. FIG. 5 illustrates a graph reflecting operation of an electrochromic device 102 based on operating conditions 502 provided by an identification tag and exact operating conditions 504 determined 314 in accordance with an embodiment described herein. More particularly, FIG. 5 illustrates the light transmission percentage (also referred to herein as tint state) as a function of time of an electrochromic device having dimension of 40 inches by 60 inches operated at a temperature of 25° C. The desired tint state sought by the operator for testing was 6% light transmission. At steady state, the electrochromic device operating based on exact operating conditions 504 as measured in accordance with an embodiment described herein had a 5.8% light transmission rate, or a deviation from desired tint state of 3.4%. At steady state, the electrochromic device operating based on the manufacturing spec conditions 502 contained in the identification tag had a 4.2% light transmission rate, or a deviation from desired tint state of 30%. Moreover, steady state was achieved using the exact operating condition in a time of approximately 50 minutes whereas steady state took approximately 65 minutes to achieve using the operating information contained in the identification tag. Accordingly, the electrochromic device was able to achieve steady state 30% faster using techniques in accordance with embodiments described herein as compared to using conditions contained in the attached identification chip including manufacturing-spec information relating to devices having dimensions of 40 inches by 60 inches.

In an embodiment, operating 320 the electrochromic device 102 can be performed with a tint fidelity of at least 75%, at least 80%, at least 85%, at least 90%, or at least 95%. In a particular embodiment, operating 320 the electrochromic device 102 can be performed with a tint fidelity of at least 99%, at least 99.5%, at least 99.9%, at least 99.95%, or at least 99.99%. As used herein, "tint fidelity"

refers to a relationship between actual tint, $T_A$, corresponding with the actual tinted state of the electrochromic device, and theoretical tint, $T_T$, corresponding with the intended (or desired) tint state. A tint fidelity of at least 99.5% can mean that $T_A$ is at least 99.5% $T_T$.

In an embodiment, one or more electrochromic devices 102 described herein can be adapted to operate with a tint fidelity of at least 99%, at least 99.5%, at least 99.9%, at least 99.95%, or at least 99.99%.

Operating arrays with low tint fidelity can be apparent to occupants of a building, particularly when the array is closely arranged such that the occupant can observe the plurality of electrochromic devices of the array under similar ambient or natural light conditions. Low tint fidelity can manifest as arrays with devices having different colors or shades. Thus, in accordance with an embodiment described herein, tint fidelity can be increased and arrays 100 can exhibit more uniform tint states.

Figure 6:
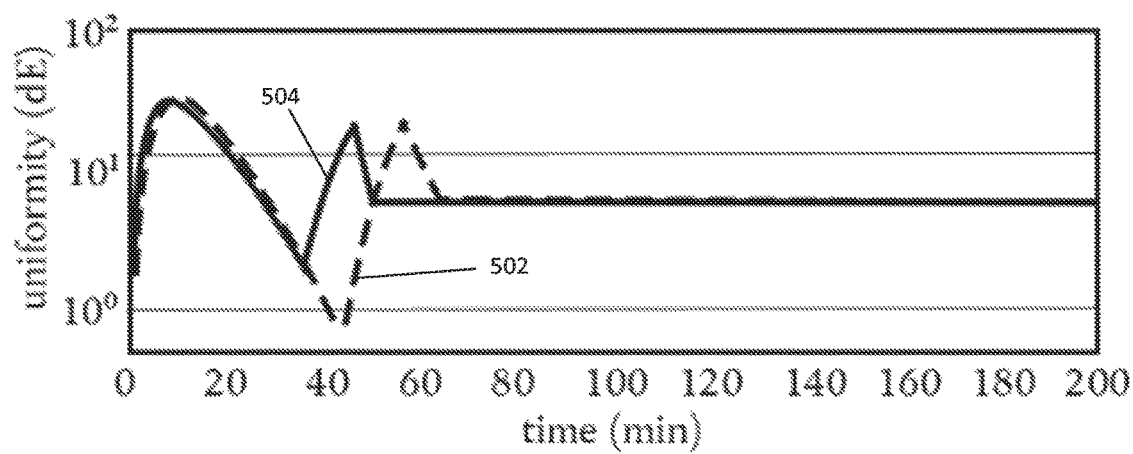

FIG. 6 illustrates a graph reflecting operation of an electrochromic device 102 based on operating conditions 502 provided by an identification tag and exact operating conditions 504 determined 314 in accordance with an embodiment described herein. More particularly, FIG. 6 illustrates uniformity (dE) of an electrochromic device 102 having dimensions of 40 inches by 60 inches and operating at a temperature of 25° C. as a function of time. As illustrated, methods described herein for operating the electrochromic device 102 can have a uniformity (dE), as measured by a maximum transmission deviation measured over the entire area of each electrochromic device 102, no less than electrochromic devices operating based on conditions provided by an identification tag.

Embodiment 1

A method of operating an electrochromic device comprising: coupling a logic device to the electrochromic device; applying a voltage to the electrochromic device; receiving a current from the electrochromic device in response to the provided voltage; and with the logic device, determining an exact operating condition of the electrochromic device from the received current.

Embodiment 2

The method of embodiment 1, further comprising operating the electrochromic device based at least in part on the exact operating condition.

Embodiment 3

The method of embodiment 2, wherein operating the electrochromic device is performed with a tint fidelity of at least 99%, at least 99.5%, at least 99.9%, at least 99.95%, or at least 99.99%.

Embodiment 4

The method of any one of the preceding embodiments, wherein the logic device is disposed at a location spaced apart from the electrochromic device.

Embodiment 5

The method of any one of the preceding embodiments, further comprising installing the electrochromic device at a first location, wherein coupling the logic device to the electrochromic device is performed at a second location spaced apart from the first location.

Embodiment 6

The method of any one of the preceding embodiments, wherein application of the voltage is continuous.

Embodiment 7

The method of any one of the preceding embodiments, wherein application of the voltage is performed for a period of at least 5 seconds, at least 30 seconds, at least 1 minute, at least 5 minutes, at least 20 minutes, at least 60 minutes, at least 200 minutes, or at least 480 minutes.

Embodiment 8

The method of any one of the preceding embodiments, wherein coupling the logic device to the electrochromic device comprises coupling the logic device to a plurality of electrochromic device.

Embodiment 9

The method of embodiment 8, wherein applying voltage to the electrochromic device comprises applying the voltage to at least two of the plurality of electrochromic devices.

Embodiment 10

The method of embodiment 9, wherein applying voltage to the plurality of electrochromic devices is performed concurrently.

Embodiment 11

The method of any one of embodiments 8-10, wherein at least two of the plurality of electrochromic devices are disposed in a same window arrangement.

Embodiment 12

The method of any one of embodiments 8-11, wherein at least two of the plurality of electrochromic devices are disposed in different window arrangements.

Embodiment 13

The method of any one of the preceding embodiments, wherein determining the exact operating condition comprises determining at least one of an ionic resistance of the electrochromic device, a leakage resistance of the electrochromic device, or a separate resistance of the electrochromic device or element connected therewith.

Embodiment 14

The method of embodiment 13, wherein the separate resistance comprises an ITO resistance, a resistance of wires coupled with the electrochromic device, or a combination thereof.

Embodiment 15

The method of any one of the preceding embodiments, wherein the exact operating condition comprises unit efficiency, unit leakage, unit capacitance, unit areal size, or any combination thereof.

Embodiment 16

The method of any one of the preceding embodiments, wherein determining the exact operating condition of the electrochromic device occurs continuously, or generally continuously, for a duration of at least 5 seconds, at least 30 seconds, at least 1 minute, at least 5 minutes, at least 20 minutes, at least 60 minutes, at least 200 minutes, or at least 480 minutes.

Embodiment 17

The method of any one of the preceding embodiments, wherein the electrochromic device is free of an identification tag.

Embodiment 18

The method of any one of the preceding embodiments, further comprising applying an additional voltage different than the applied voltage.

Embodiment 19

The method of embodiment 18, further comprising validating the exact operating condition in response to receiving current in response to the additional voltage.

Embodiment 20

The method of embodiment 19, further comprising adjusting the exact operating condition in view of the received current in response to the additional voltage.

Embodiment 21

An electrochromic device comprising an electrochromic device adapted to operate with a tint fidelity of at least 99%, at least 99.5%, at least 99.9%, at least 99.95%, or at least 99.99%.

Embodiment 22

The electrochromic device of embodiment 21, wherein the electrochromic device is free of an identification tag.

Embodiment 23

The electrochromic device of any one of embodiments 21 and 22, wherein the electrochromic device is coupled with a power source, and wherein an applied voltage from the power source to the electrochromic device is based on an exact operating condition of the electrochromic device.

Embodiment 24

The electrochromic device of embodiment 23, wherein the exact operating condition comprises a unit efficiency, unit leakage, unit capacitance, unit areal size, or any combination thereof.

Embodiment 25

A method of operating a plurality of electrochromic devices comprising: adjusting a frequency of voltage applied to the plurality of electrochromic devices, wherein each of the plurality of electrochromic devices is adjusted by a different frequency; measuring a duration of time required to change tint states of each of the electrochromic devices; and identifying a location of each of the plurality of electrochromic devices in response to the measured duration of time required to change the tint states of each of the electrochromic device.

Embodiment 26

The method of embodiment 25, further comprising operating at least one particular electrochromic device of the plurality of electrochromic devices after identifying the location of the at least one particular electrochromic device.

Embodiment 27

The method of any one of embodiments 25 and 26, wherein adjusting the frequency of voltage is performed simultaneously for all of the plurality of electrochromic devices.

Embodiment 28

The method of any one of embodiments 25-27, wherein adjusting the frequency of voltage is performed by a logic device disposed at a location spaced apart from the plurality of electrochromic devices.

Embodiment 29

The method of any one of embodiments 25-28, wherein at least one of the plurality of electrochromic devices is at an unknown tint state prior to adjusting the frequency of the voltage.

Embodiment 30

The method of any one of embodiments 25-29, wherein all of the plurality of electrochromic devices are at unknown tint states prior to adjusting the frequency of the voltage.

Embodiment 31

The method of any one of embodiments 25-30, wherein adjusting the frequency of voltage is performed prior to measuring the duration of time required to change tint states.

Embodiment 32

The method of any one of embodiments 25-31, wherein adjusting the frequency of voltage comprises adjusting the frequency of voltage a plurality of times for at least one of the electrochromic devices.

Embodiment 33

The method of embodiment 32, wherein adjusting the frequency of voltage occurs at a plurality of equally spaced apart intervals.

Embodiment 34

The method of any one of embodiments 32 and 33, wherein the method further comprises measuring the duration of time required between successive adjustments of frequency of voltage.

Embodiment 35

The method of any one of embodiments 25-34, wherein adjusting the frequency of voltage is performed by a power source.

Embodiment 36

The method of any one of embodiments 25-35, further comprising detecting the tint state of the plurality of electrochromic devices after adjusting the frequency of voltage.

Embodiment 37

The method of embodiment 36, wherein detecting the tint state is performed using an image capture device, such as a camera or a video camera.

Embodiment 38

The method of any one of embodiments 36 and 37, wherein detecting the tint state is performed a plurality of times at spaced apart intervals.

Embodiment 39

The method of embodiment 38, wherein the spaced apart intervals are equally spaced apart.

Embodiment 40

The method of any one of embodiments 25-39, wherein the method is part of a commissioning process for an array comprising the plurality of electrochromic devices.

Embodiment 41

A system for operating a plurality of electrochromic devices comprising: a power source adapted to supply a voltage to each of the plurality of electrochromic devices, wherein the power source is adapted to provide a plurality of voltage frequencies to the plurality of electrochromic devices; an image capture device adapted to detect a tint state of the plurality of electrochromic devices; a logic device adapted to measure a duration of time required to change tint states of each of the electrochromic devices and identify a location of each of the plurality of electrochromic devices in response to the measured duration of time.

Embodiment 42

The system of embodiment 41, wherein the power source is spaced apart from the plurality of electrochromic devices.

Embodiment 43

The system of any one of embodiments 41 and 42, wherein all of the plurality of electrochromic devices are free of identification tags.

Embodiment 44

The system of any one of embodiments 41-43, wherein the image capture device comprises a camera or a video camera.

Embodiment 45

The system of any one of embodiments 41-44, wherein the image capture device comprises a smart phone.

Embodiment 46

The system of any one of embodiments 41-45, wherein the image capture device is adapted to capture a first image of the plurality of electrochromic devices when the power source is applying a first voltage frequency to each of the plurality of electrochromic devices and a second image when the power source is applying a second voltage frequency to each of the plurality of electrochromic devices.

Embodiment 47

A system for operating a plurality of electrochromic devices comprising: a power source adapted to supply a voltage to each of the plurality of electrochromic devices, wherein the power source is adapted to provide a plurality of voltage magnitudes or frequencies to the plurality of electrochromic devices; an image capture device adapted to detect a tint state of the plurality of electrochromic devices; and a logic device adapted to: measure a duration of time required to change tint states of each of the electrochromic devices and identify a location of each of the plurality of electrochromic devices in response to the measured duration of time, determine an exact operating condition of the electrochromic device from a received current in response to the provided voltage, or both.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method of operating a plurality of electrochromic devices comprising:
    adjusting a frequency of voltage applied to the plurality of electrochromic devices, wherein each of the plurality of electrochromic devices is adjusted by a different frequency;
    measuring a duration of time required to change tint states of each of the electrochromic devices; and
    identifying a location of each of the plurality of electrochromic devices based on the measured duration of time required to change the tint states of each of the electrochromic device.

2. The method of claim 1, further comprising operating at least one particular electrochromic device of the plurality of electrochromic devices after identifying the location of the at least one particular electrochromic device.

3. The method of claim 1, wherein adjusting the frequency of voltage is performed simultaneously for all of the plurality of electrochromic devices.

4. The method of claim 1, wherein adjusting the frequency of voltage is performed by a logic device disposed at a location spaced apart from the plurality of electrochromic devices.

5. The method of claim 1, wherein at least one of the plurality of electrochromic devices is at an unknown tint state prior to adjusting the frequency of the voltage.

6. The method of claim 1, wherein all of the plurality of electrochromic devices are at unknown tint states prior to adjusting the frequency of the voltage.

7. The method of claim 1, wherein adjusting the frequency of voltage is performed prior to measuring the duration of time required to change tint states.

* * * * *